US010059068B2

(12) United States Patent
Christensen

(10) Patent No.: US 10,059,068 B2
(45) Date of Patent: Aug. 28, 2018

(54) COMPOSITE STRUCTURE AND METHOD OF FORMING THEREOF

(71) Applicant: The Boeing Company, Seal Beach, CA (US)

(72) Inventor: Stephen Christensen, Sammamish, WA (US)

(73) Assignee: The Boeing Company, Chicago, IL (US)

(*) Notice: Subject to any disclaimer, the term of this patent is extended or adjusted under 35 U.S.C. 154(b) by 1124 days.

(21) Appl. No.: 14/257,663

(22) Filed: Apr. 21, 2014

(65) Prior Publication Data

US 2016/0214335 A1 Jul. 28, 2016

(51) Int. Cl.

| | |
|---|---|
| ***B29C 70/74*** | (2006.01) |
| ***B32B 3/02*** | (2006.01) |
| ***B32B 3/12*** | (2006.01) |
| ***B29C 70/86*** | (2006.01) |
| *B29L 31/30* | (2006.01) |

(52) U.S. Cl.

CPC .......... *B29C 70/745* (2013.01); *B29C 70/865* (2013.01); *B32B 3/02* (2013.01); *B32B 3/12* (2013.01); *B29L 2031/3076* (2013.01); *B32B 2605/18* (2013.01)

(58) Field of Classification Search

None

See application file for complete search history.

(56) References Cited

U.S. PATENT DOCUMENTS

| | | | | |
|---|---|---|---|---|
| 3,528,753 A * | 9/1970 | Dutton | B64C 27/473 244/123.9 |
| 5,558,919 A * | 9/1996 | Toni | B64D 33/04 428/116 |
| 5,753,340 A * | 5/1998 | Welch | B32B 3/12 428/117 |
| 6,562,436 B2 * | 5/2003 | George | B32B 5/12 428/133 |
| 7,169,343 B1 * | 1/2007 | Mills | B29C 44/569 156/173 |
| 2002/0031641 A1 * | 3/2002 | George | B32B 5/12 428/113 |
| 2003/0044570 A1 * | 3/2003 | George | B32B 5/12 428/105 |
| 2015/0136308 A1 * | 5/2015 | Bremmer | B32B 3/12 428/116 |

* cited by examiner

*Primary Examiner* — Nicholas W. Jordan

(74) *Attorney, Agent, or Firm* — Armstrong Teasdale LLP

(57) ABSTRACT

A composite structure that includes a plurality of components coupled together forming a joint, wherein the plurality of components are oriented such that a gap is defined at least partially therebetween. The composite structure also includes a filler structure positioned in the gap. The filler structure includes a honeycomb core including side walls that define a plurality of core cells, and an amount of resin within each of the plurality of core cells. The honeycomb core side walls facilitate restricting crack propagation in the resin from spreading between adjacent pairs of the plurality of core cells.

14 Claims, 4 Drawing Sheets

COMPOSITE STRUCTURE AND METHOD OF FORMING THEREOF

BACKGROUND

The field of the present disclosure relates generally to composite structures and, more specifically, to filler materials that facilitate restricting crack propagation within noodle regions of composite laminated joints.

Cracking of integrally stiffened composite structures, especially in aerospace applications, often initiates in a radius filler (i.e., noodle) located at an interface between a skin and integral stiffening elements of the composite structures. At least some known radius fillers are formed at least partially from an amount of resin. Cracks in the resin may form during manufacture of the composite structures as a result of improper tooling, improper handling of tools, and/or residual tensile strain. For example, residual tensile strain in composite structures may form as a result of a mismatch between the coefficients of thermal expansion creating a strain environment in the radius filler that exceeds the critical cracking strain of the resin. The geometry of the structure surrounding the radius filler creates a three-dimensional constraint to shrinkage upon cooling of the resin after it has been cured and hardened.

Exemplary radius filler materials include, but are not limited to, pre-impregnated (i.e., prepreg) composite materials (e.g., layered strips and/or rolled prepreg composite material), and/or pure resin. In at least some known composite structures, crack propagation in the radius filler can cause delamination of the plies in adjacent laminated joints. More specifically, crack propagation in the radius filler may initiate degradation of the laminated joints. While limiting the formation of cracks in the radius filler would ensure the integrity of the laminated joints, preventing cracks from forming entirely is generally difficult, if not impossible. Moreover, the difficulty in limiting crack formation in radius fillers increases as composite structures are fabricated in increasingly large sizes. As such, there is a need for systems and methods that ensure cracks in a radius filler do not initiate degradation of laminated joints.

BRIEF DESCRIPTION

In one aspect, a composite structure is provided. The composite structure includes a plurality of components coupled together forming a joint, wherein the plurality of components are oriented such that a gap is defined at least partially therebetween. The composite structure also includes a filler structure positioned in the gap. The filler structure includes a honeycomb core including side walls that define a plurality of core cells, and an amount of resin within each of the plurality of core cells. The honeycomb core side walls facilitate restricting crack propagation in the resin from spreading between adjacent pairs of the plurality of core cells.

In another aspect, a filler structure for use in filling a radius gap defined between a plurality of components forming a joint is provided. The filler structure includes a honeycomb core including side walls that define a plurality of core cells, and an amount of resin within each of the plurality of core cells. The honeycomb core side walls facilitate restricting crack propagation in the resin from spreading between adjacent pairs of the plurality of core cells.

In yet another aspect, a method of forming a composite structure is provided. The method includes coupling a plurality of components together forming a joint, wherein the plurality of components are oriented to form a radius gap therebetween. The method also includes forming a filler structure that includes a honeycomb core and an amount of resin. The honeycomb core includes side walls that define a plurality of core cells and the resin within each of the plurality of core cells. The honeycomb core side walls facilitate restricting crack propagation in the resin from spreading between adjacent pairs of the plurality of core cells. The method also includes positioning the filler structure in the radius gap, and applying at least one of heat or pressure to the plurality of components and the filler structure.

The features, functions, and advantages that have been discussed can be achieved independently in various implementations of the present disclosure or may be combined in yet other implementations further details of which can be seen with reference to the following description and drawings.

DETAILED DESCRIPTION

The implementations described herein relate to composite structures including radius filler structures that facilitate restricting crack propagation of resin in radius gaps (i.e., noodle regions) in the composite structures. In the exemplary implementation, the filler structures include a honeycomb core and an amount of resin within core cells of the honeycomb core. The filler structure is positioned in the radius gap of a composite structure, and as cracks begin to propagate in the resin in the core cells, side walls of the honeycomb core facilitate restricting the crack propagation from spreading between adjacent core cells. As such, the crack propagation is controlled to facilitate maintaining the integrity of a joint defined between adjoining components of the composite structure.

Figure 1:
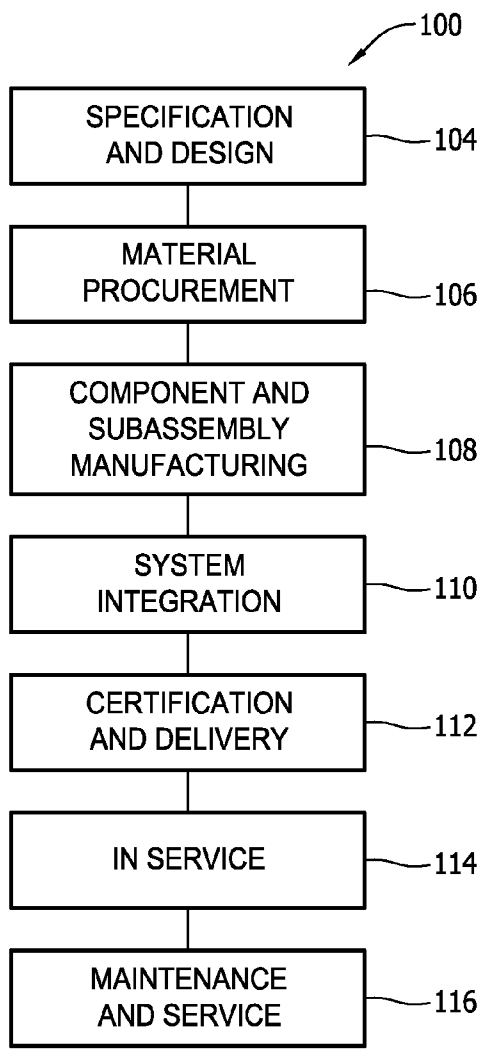
FIG. 1 is a flow diagram of an exemplary aircraft production and service method.
Figure 2:
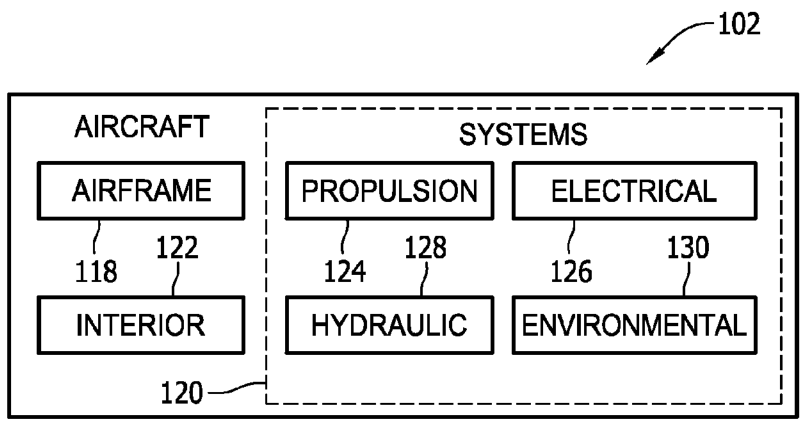
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via vehicles other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
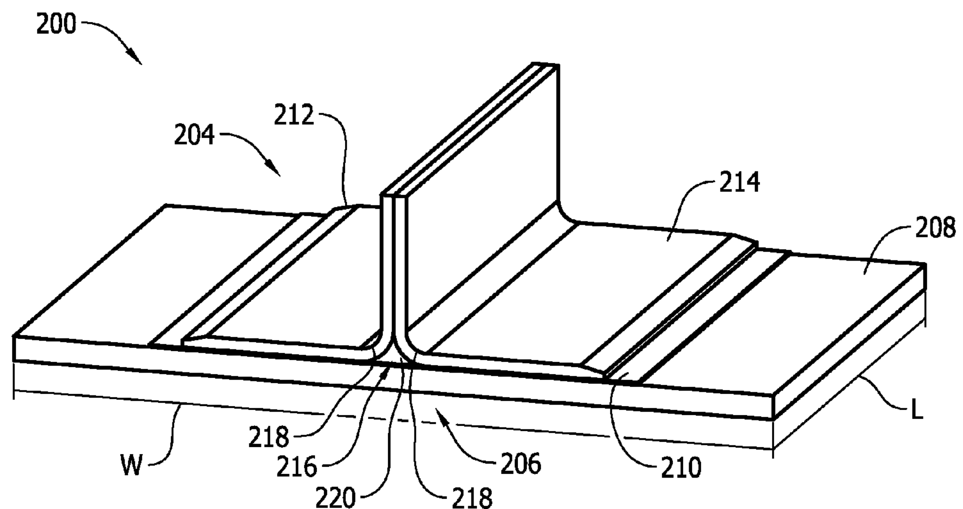
FIG. 3 is a schematic illustration of an exemplary composite structure that may be used in the aircraft shown in FIG. 2.
Figure 4:
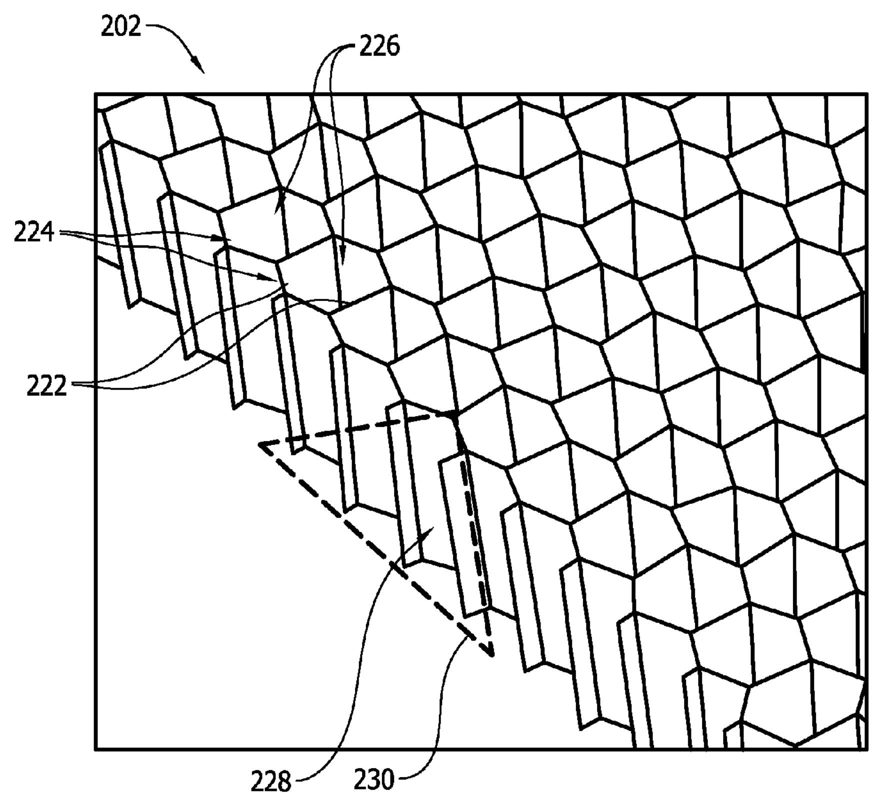
FIG. 4 is a schematic illustration of an exemplary honeycomb core.

FIG. 3 is a schematic illustration of an exemplary composite structure 200 that may be used in aircraft 102 (shown in FIG. 2), and FIG. 4 is a schematic illustration of an exemplary honeycomb core 202. In the exemplary implementation, composite structure 200 includes a plurality of components 204 coupled together to form a T-joint 206. Components 204 include a skin panel 208, a plank 210 coupled to skin panel 208, a first stiffener 212 coupled to plank 210, and a second stiffener 214 coupled to plank 210. Components 204 are oriented such that a radius gap 216 is defined between plank 210 and first and second stiffeners 212 and 214. More specifically, radius gap 216 extends along a length L of composite structure 200 and is defined at least partially by opposing complementary bent portions 218 of first and second stiffeners 212 and 214. In an alternative implementation first and second stiffeners 212 and 214 may be coupled directly to skin panel 208.

Composite structure 200 also includes a filler structure 220 positioned in radius gap 216. Referring to FIG. 4, filler structure 220 includes at least a portion of honeycomb core 202 and an amount of resin (not shown in FIG. 3). More specifically, honeycomb core 202 includes side walls 222 that define a plurality of substantially hexagonal core cells 224, and the resin is within and substantially fills core cell passages 226 of each core cell 224. An exemplary resin includes, but is not limited to, an epoxy or other suitable polymer-based adhesives. Moreover, side walls 222 are fabricated from material that facilitates restricting crack propagation in the resin from spreading between adjacent core cells 224. For example, in the exemplary implementation, side walls 222 of honeycomb core 202 are fabricated from at least one ply of composite material. In an alternative implementation, honeycomb core 202 may be fabricated such that core cells 224 have any cross-sectional shape, and may be fabricated from any material that enables filler structure 220 to function as described herein.

As will be described in more detail below, filler structure 220 is formed by cutting honeycomb core 202 to form cut sections 228 that have a predetermined cross-sectional shape. More specifically, honeycomb core 202 is cut along one of predetermined outlines 230 such that cut sections 228 have a cross-sectional shape that substantially matches a cross-sectional shape of radius gap 216 as filler structure 220 extends along length L within radius gap 216. Moreover, an angle of the cut through honeycomb core 202 at predetermined outlines 230 is selected as a function of a predicted direction of crack propagation in the resin in core cells 224. For example, honeycomb core 202 is cut at an angle along predetermined outlines 230 that ensures side walls 222 intersect a crack plane (not shown in FIG. 4) extending through the resin when filler structure 220 is properly oriented within radius gap 216.

Figure 5:
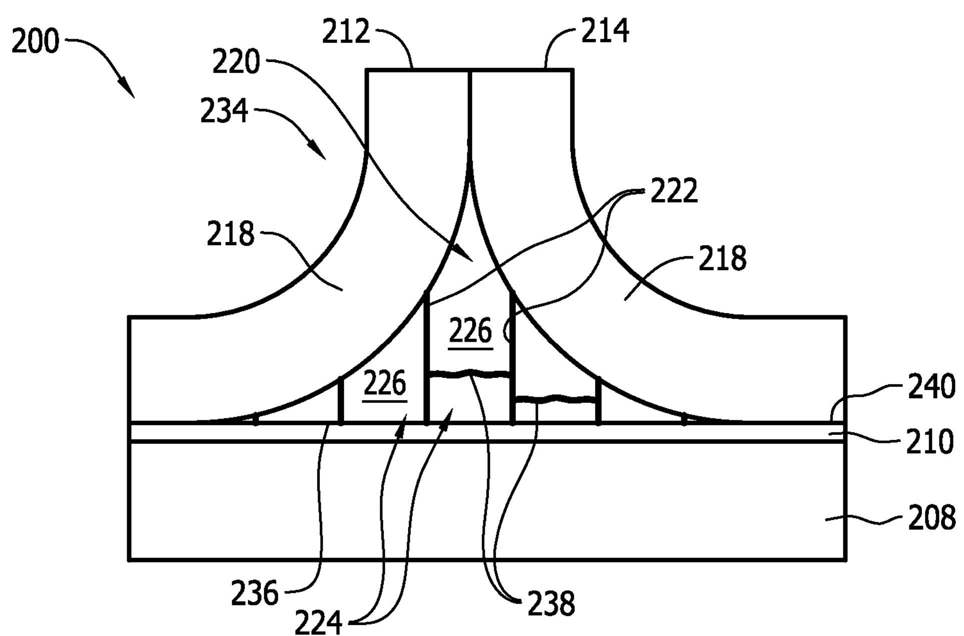
FIG. 5 is an enlarged schematic illustration of an exemplary filler structure that may be used in the composite structure shown in FIG. 4

FIG. 5 is an enlarged schematic illustration of an exemplary filler structure 220 within radius gap 216 (shown in FIG. 3). In the exemplary implementation, core cells 224 are substantially filled with an amount of hardened resin 236. As will be described in more detail below, resin 236 is cured and hardened either before and/or during fabrication of composite structure 200. Filler structure 220 facilitates maintaining the integrity of T-joint 206 as heat and pressure is applied to components 204 during fabrication of composite structure 200.

In some implementations, after the heat and pressure has been removed from components 204 and as a temperature of resin 236 returns to an ambient temperature, a crack plane 238 can form in resin 236. Crack planes 238 can propagate in resin 236 in any direction, and the direction of crack propagation is generally predictable based on an orientation of components 204 adjacent radius gap 216. As such, filler structure 220 is positioned in radius gap 216 to orient core cell passages 226 at any angle relative to the direction of crack propagation that ensures side walls 222 intersect crack planes 238, and/or that ensures crack planes 238 are isolated within individual core cells 224.

For example, in the exemplary implementation, crack planes 238 propagate in resin 236 along a width W (shown in FIG. 3) of composite structure 200 in a direction substantially parallel to a surface 240 of plank 210. Filler structure 220 in a first orientation 234 within radius gap 216 orients core cell passages 226 to extend in a substantially perpendicular direction relative to surface 240 of plank 210. As such, core cell passages 226 extend in a substantially perpendicular direction relative to crack planes 238 and/or the direction of crack propagation to ensure side walls 222 intersect with crack planes 238. In an alternative implementation, filler structure 220 is oriented within radius gap 216 such that core cell passages 226 extend in an oblique direction relative to the direction of crack propagation at any angle that ensures side walls 222 intersect crack planes 238.

Figure 6:
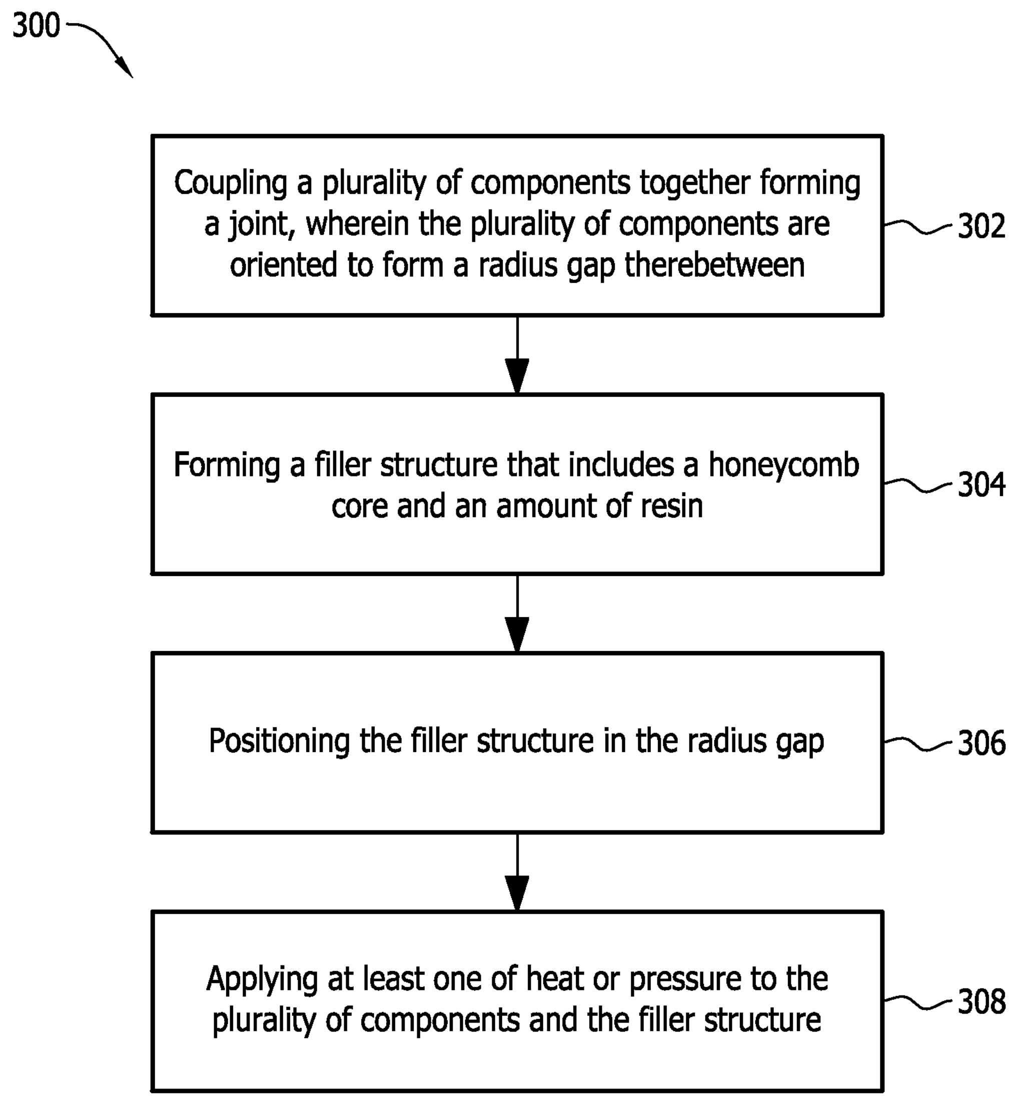
FIG. 6 is a flow diagram of an exemplary method of forming a composite structure.

FIG. 6 is a flow diagram of an exemplary method 300 of forming a composite structure, such as composite structure 200. Method 300 includes coupling 302 components 204 together to form T-joint 206, wherein components 204 are oriented to form radius gap 216 therebetween. A filler structure 220 is formed 304 that includes at least a portion of honeycomb core 202 and an amount of resin 236. Honeycomb core 202 includes side walls 222 that define a plurality of core cells 224 and resin 236 is within each of core cells 224. Side walls 222 restrict crack propagation in resin 236 from spreading between adjacent core cells 224. The method also includes positioning 306 filler structure 220 in radius gap 216, and applying 308 at least one of heat or pressure to components 204 and filler structure 220. The heat and/or pressure may be applied via a vacuum bagging process, and/or composite structure 200 may be placed in an autoclave (not shown).

In some implementations, forming 304 filler structure 220 includes substantially filling core cells 224 of honeycomb core 202 with the amount of resin 236, curing the amount of resin 236 within core cells 224, and forming filler structure 220 to have a cross-sectional shape that substantially matches a cross-sectional shape of radius gap 216 before being positioned in radius gap 216. More specifically, the amount of resin 236 is cured and hardened in core cells 224 to form an initial filler structure (not shown) before a geometry of the initial filler structure is modified to substantially match a cross-sectional shape of radius gap 216. Alternatively, honeycomb core 202 is formed to have a cross-sectional shape that substantially matches a cross-sectional shape of radius gap 216 (i.e., cut sections 228), and core cells 224 are substantially filled with the amount of resin 236 after a geometry of honeycomb core 202 has been modified. The modified honeycomb core 202 and uncured resin 236 is then positioned in radius gap 216, and the uncured resin 236 cures and hardens as heat and/or pressure is applied to components 204 and/or filler structure 220.

In some implementations, positioning 306 filler structure 220 in radius gap 216 includes positioning 306 filler structure 220 in radius gap 216 such that side walls 222 of honeycomb core 202 are oriented to intersect crack plane 238 in resin 236. The orientation of filler structure 220 in radius gap 216 is selected based on a predicted direction of crack propagation in resin 236. Moreover, positioning 306 filler structure 220 in radius gap 216 includes orienting filler structure 220 within radius gap 216 such that core cell passages 226 of the plurality of core cells 224 extend in a substantially perpendicular direction relative to a predicted direction of crack propagation.

The implementations described herein relate to a filler structure for use in filling radius gaps defined between components of a composite structure. The filler structure includes at least a portion of a honeycomb core including side walls that define a plurality of core cells, and an amount of resin within each of the core cells. The filler structure is oriented within the radius gap such that the side walls of the honeycomb core intersect crack planes forming in the resin and restrict the crack planes from spreading beyond respective core cells. By isolating the crack planes within respective core cells, continuous crack planes are unable to spread towards interfaces between components in the composite structure. As such, the filler structure described herein facilitates inhibiting crack planes from initiating delamination of components and/or failure of joints in the composite structure.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A composite structure comprising:
- a plurality of components coupled together forming a joint, wherein said plurality of components are oriented such that a gap is defined at least partially therebetween and wherein at least one of said plurality of components comprises a bent portion such that a radius gap is defined between said plurality of components; and
- a filler structure positioned in said gap, said filler structure comprising:
  - a honeycomb core comprising side walls that define a plurality of core cells; and
  - an amount of resin within each of said plurality of core cells, wherein said side walls facilitate restricting crack propagation in the resin from spreading between adjacent pairs of said plurality of core cells.

2. The composite structure in accordance with claim 1, wherein said plurality of components are coupled together such that said gap extends along a length of said plurality of components.

3. The composite structure in accordance with claim 1, wherein said honeycomb core has a cross-sectional shape that substantially matches a cross-sectional shape of said gap.

4. The composite structure in accordance with claim 1, wherein said honeycomb core side walls are fabricated from at least one ply of composite material.

5. The composite structure in accordance with claim 1, wherein the resin comprises an epoxy material.

6. The composite structure in accordance with claim 1, wherein the amount of resin substantially fills each of said plurality of core cells.

7. The composite structure in accordance with claim 1, wherein the plurality of components comprises a first component having a flat surface that at least partially defines said gap, and wherein said filler structure is oriented such that said side walls of said honeycomb core extend perpendicularly relative to said flat surface.

8. A method of forming a composite structure, said method comprising:
- coupling a plurality of components together forming a joint, wherein at least one of the plurality of components comprises a bent portion such that a radius gap is defined between the plurality of components, and wherein the plurality of components are oriented to form the radius gap therebetween;
- forming a filler structure that includes a honeycomb core and an amount of resin, the honeycomb core including side walls that define a plurality of core cells and the resin within each of the plurality of core cells, wherein the side walls facilitate restricting crack propagation in the resin from spreading between adjacent pairs of the plurality of core cells;
- positioning the filler structure in the radius gap; and
- applying at least one of heat or pressure to the plurality of components and the filler structure.

9. The method in accordance with claim 8, wherein forming a filler structure comprises:
- substantially filling the plurality of core cells with the amount of resin;

curing the amount of resin within the plurality of core cells; and forming the filler structure to have a cross-sectional shape that substantially matches a cross-sectional shape of the radius gap before being positioned in the radius gap.

10. The method in accordance with claim 8, wherein forming a filler structure comprises:

forming the honeycomb core to have a cross-sectional shape that substantially matches a cross-sectional shape of the radius gap; and substantially filling the plurality of core cells with the amount of resin after a geometry of the honeycomb core has been modified.

11. The method in accordance with claim 10, wherein applying at least one of heat or pressure comprises curing the amount of resin within the plurality of core cells.

12. The method in accordance with claim 8, wherein positioning the filler structure in the radius gap comprises positioning the filler structure in the radius gap such that the honeycomb core side walls are oriented to intersect a crack plane defined in the resin.

13. The method in accordance with claim 12, wherein positioning the filler structure in the radius gap comprises selecting an orientation of the filler structure in the radius gap based on a predicted direction of crack propagation in the resin.

14. The method in accordance with claim 12, wherein positioning the filler structure in the radius gap comprises orienting the filler structure within the radius gap such that core cell passages extending through the plurality of core cells extend in a substantially perpendicular direction relative to a predicted direction of crack propagation.

* * * * *